US006223168B1

(12) United States Patent
McGurl et al.

(10) Patent No.: US 6,223,168 B1
(45) Date of Patent: Apr. 24, 2001

(54) AUTOMATIC REMITTANCE DELIVERY SYSTEM

(75) Inventors: Daniel M. McGurl, York; Margaret O'Toole, North Berwick, both of ME (US); Helmar Herman, Lee, NH (US)

(73) Assignee: Bottomline Technologies, Inc., Portsmouth, NH (US)

( * ) Notice: Subject to any disclaimer, the term of this patent is extended or adjusted under 35 U.S.C. 154(b) by 0 days.

(21) Appl. No.: 09/223,106

(22) Filed: Dec. 30, 1998

Related U.S. Application Data

(63) Continuation-in-part of application No. 08/506,579, filed on Jul. 25, 1995, now Pat. No. 5,893,080.

(51) Int. Cl.⁷ .................................................. G06F 17/60
(52) U.S. Cl. .............................. 705/40; 705/39; 709/230
(58) Field of Search ................................... 705/1, 16, 17, 705/26, 27, 30, 34, 35, 39, 40; 709/217, 218, 219, 230

(56) References Cited

U.S. PATENT DOCUMENTS

| | | | | |
|---|---|---|---|---|
| 4,385,285 | * | 5/1983 | Horst et al. | 382/379 |
| 4,484,307 | * | 11/1984 | Quatse et al. | 705/410 |
| 5,121,945 | * | 6/1992 | Thomson et al. | 283/58 |
| 5,193,055 | * | 3/1993 | Brown et al. | 364/406 |
| 5,283,829 | * | 2/1994 | Anderson | 380/24 |
| 5,377,309 | * | 12/1994 | Sonobe et al. | 706/60 |
| 5,383,113 | * | 1/1995 | Kight et al. | 395/240 |
| 5,394,469 | * | 2/1995 | Nagel et al. | 380/4 |
| 5,465,206 | * | 11/1995 | Hilt et al. | 395/240 |
| 5,504,677 | * | 4/1996 | Pollin | 705/45 |
| 5,557,798 | * | 9/1996 | Skeen et al. | 705/35 |
| 5,570,465 | * | 10/1996 | Tsakanikas | 395/114 |
| 5,717,868 | * | 2/1998 | James | 705/35 |
| 5,727,249 | * | 3/1998 | Pollin | 705/40 |
| 5,745,886 | * | 4/1998 | Rosen | 705/39 |
| 5,793,028 | * | 8/1998 | Wagener et al. | 235/380 |
| 5,794,234 | * | 8/1998 | Church et al. | 707/4 |
| 5,799,087 | * | 8/1998 | Rosen | 380/24 |
| 5,893,080 | * | 4/1999 | McGurl et al. | 705/40 |

FOREIGN PATENT DOCUMENTS

| WO 97/17678 | * | 5/1997 | (WO) . |
| WO 99/03243 | * | 1/1999 | (WO) . |

OTHER PUBLICATIONS

Osborne et al: "Bank–VAN duo high–steps over those EDI blues, (value–added network, electronic data interchange)"; Corporate Cashflow Magazine, Oct. 1990, v11, n11, p. 72.*

Knudson et al: "Business–to–business payments and the role of financial electronic data interchange"; Federal Reserve Bulletin, Apr. 1994, v80, n4, pp. 269–278.*

"ICM Provides Technology Support to State Street Electronic Banking Initiative"; PR Newswire, Oct. 1, 1997, p. 1001NYW1555.*

* cited by examiner

Primary Examiner—Edward R. Cosimano
(74) Attorney, Agent, or Firm—Hayes, Soloway, Hennessey, Grossman & Hage, P.C.

(57) ABSTRACT

A remittance delivery system is provided that that accepts payment information from a variety of applications (e.g. vendor payments, taxes, claims, payroll, T&E, commissions, trust, etc.), translates the data into a single, unified data file structure, and forwards the remittance data via a user-defined path, for example, email, fax, print, internet, etc. Accordingly, the preferred embodiment of the present invention provides a remittance delivery system comprising a file integration engine is provided for receiving payment data including remittance data in a one of a plurality of data formats and translating and formatting the payment data into a single, pre-defined data format. In addition, a remittance generating engine is provided for receiving the pre-defined data and for forwarding remittance data to at least one remittance recipient.

16 Claims, 4 Drawing Sheets

```
01                                        02/25/98      00376694      ******1,266.51
02
03   ONE THOUSAND TWO HUNDRED SIXTY SIX AND 51/100 DOLLARS
04
05       ABC Company
06       P O BOX XXXXX
07       TULSA  OK   88888
08
09
10
11       AP-000-0004948    CSW SERVICES, INC.                    00376694
12       106856 116426                  01-28-98    40.08    .00    40.08
13       107579 117006                  01-29-98    15.71    .00    15.71
14       107584 116414                  01-28-98   120.46    .00   120.46
15       107609 115397A                 01-29-98     7.82    .00     7.82
16       107611 116983                  01-29-98    47.08    .00    47.08
17       108608 117121                  01-29-98   143.66    .00   143.66
18       108671 115947                  01-28-98   173.78    .00   173.78
19       109180 117371                  01-29-98   419.51    .00   419.51
20       ORD# 27193
21       110711 116613                  01-28-98   274.51    .00   274.51
22       110942 116499                  01-29-98    23.90    .00    23.90
23
24                        TOTALS                 1,266.51    .00  1,266.51
```

FIG. 4

AUTOMATIC REMITTANCE DELIVERY SYSTEM

This application is a continuation-in-part of application Ser. No. 506,579 filed Jul. 25, 1995 and assigned to the same assignee, which issued as U.S. Pat. No. 5,893,080 on Apr. 6, 1999.

BACKGROUND OF THE INVENTION

1. Field of the Invention

The present invention relates generally to a computerized disbursement system and method, and, more specifically, to a computerized system and method for automatic remittance delivery via one or more delivery mechanisms, based upon pre-defined criteria stored in a database.

2. Brief Description of Related Art

Computerized financial data processing and accounting systems are well known in the art. Typically, such systems permit the user to effectuate disbursements by e.g., printing checks and making payments via electronic funds transfers (EFT), monitor and balance bank accounts, and/or perform automated auditing and billing functions.

One prior art financial data processing system is disclosed in U.S. Pat. No. 5,121,945 to Thompson et al. The system disclosed in this patent automatically debits or credits multiple bank account records and accounts receivable records based customer payments. The system prepares integrated documents including an invoice and a check using a laser printer. Issuance of the document is based upon database tables with information including customer name and address, financial institution and account number, payee name and address, billing amount, accounts receivable account number, etc. Such data may be input manually or from other databases. The document is sent to the customer being invoiced, who fills out various sections of the front portion of the check, signs it, and returns it to the invoicer for cashing. The system also permits payment by EFT rather than check, via e.g., credit card, automated clearing house, automatic teller machine, etc. Access to database information may be protected by requiring entry of a password and/or security code information. The system also generates various accounting reports based upon the customer database information.

Another such system is disclosed in U.S. Pat. No. 4,385,285 to Horst et al. The patent discloses a check dispensing system for issuing checks from a terminal. The system includes an identification card reader for identifying an account number from which to draw funds for the check and a handwriting transducer from inputting identification data to determine whether the user is authorized to issue checks from the account number. The system also includes a keypad for inputting the desired amount of the check and bank data system for evaluating the current balance of the account and whether there are sufficient funds to issue the check for the amount requested. The system evaluates whether the signature provided via the transducer matches with an authorized signature on file and/or requests other authentication data, e.g., palm print, identification number, etc. If the system accepts the user's request to issue the check, the user then is prompted to input a payee code number to identify to whom the check is to be made payable. A printer prints the check.

Another prior art financial data processing system is provided by Intuit corporation's Quicken 5™ financial management computer program. The Quicken 5™ program tracks user checking, savings, credit card, investment, and loan accounts. It also performs basic budgeting, financial planning, and audit report generating functions. It also includes check disbursement (from pre-printed check stock) and electronic bill paying functions.

Yet another prior art financial data processing system is provided by Bottomline Technologies, Inc., the assignee of the subject application, by the company's Lasercheck® computer program. The company's Lasercheck® computer program comprises a standalone check writing system which permits a user to produce a completed check on blank paper using MICR information. The company's Lasercheck® computer program also performs basic accounting report generating functions and security while eliminating typing or handwritten checks.

Unfortunately, none of the aforesaid prior art permits fully automated payment disbursement according to user-predefined criteria, such as, disbursement financial account (e.g., bank or investment account number and type of account) and manner of payment (e.g., whether disbursement is to be made by hard-copy Magnetic Ink Character Recognizable (MICR) negotiable instrument or by EFT) for different types of disbursements to be made (e.g., payments to suppliers rebates, taxes, etc.) and individual disbursement requests (e.g., including such information as disbursement amount, intended payee, etc.). Additionally, none of the aforesaid prior art provides fully automated diagnostic means for monitoring whether the system is functioning properly and for preventing improper disbursements from taking place.

Other examples of prior art financial data processing systems and methods are disclosed in U.S. Pat. No. 5,283,829 to Anderson and U.S. Pat. No. 5,193,055 to Brown. These systems and methods also suffer from the aforesaid and/or other disadvantages of the aforesaid prior art.

Another aspect of payment disbursement is remittance data delivery. Remittance data information, as is understood in the art, is generally of the form of a list of items for which the payee is receiving payment, and may include item purchased (e.g., serial number, name, SKU, etc.), date purchased, itemized amount, total amount, etc.

For example, for transactions between enterprises, financial EDI (FEDI) is the recommended solution for organizations wishing to pay other organizations (typically vendors) electronically. FEDI requires that the payor have specialized software to create standardized electronic payment formats. Moreover, the vendor's bank must be capable of transacting under the FEDI standard. However, according to the National Automated Clearing House Association (NACHA), only 15% of banks in the US are able or willing to receive and pass on FEDI information. Also, the vendor (payee) must translate the electronic invoice information included with the payment and map the information into their accounts receivable system. Thus, significant roadblocks exist for businesses wishing to reap the benefits of paying electronically.

Transactions among individual suffer similar drawbacks. For example, some payroll systems can produce electronic payments for employees. Most other payment systems, for example, T&E, claims, trust, interested and dividend, still only create paper checks. Even if the payment is made electronically, the payee is notified of the payment via a "deposit advice form"—a piece of paper. This deposit advice form still requires handling, possibly postage, and distribution. Mail delays and loss create confusion and dissatisfaction on the vendors side.

SUMMARY OF THE INVENTION

Accordingly, the present invention to overcome these drawbacks of prior art remittance advice delivery by automatically coupling the payment data portion of payment information (from a payor to a vendor) with the remittance statement data that is associated with the payment data to facilitate seamless reconciliation of accounts receivable.

In addition, the present inventions solves integration shortcomings of the prior art by providing a system that accepts payment information from a variety of applications (e.g. vendor payments, taxes, claims, payroll, T&E, commissions, trust, etc.), translates the data into a single, unified data file structure, and forwards the remittance data via a user-defined path, for example, email, fax, print, internet, etc.

Accordingly, the preferred embodiment of the present invention provides a remittance delivery system comprising a file integration engine for receiving payment data including remittance data in a one of a plurality of data formats and translating and formatting the payment data into a single, pre-defined data format. In addition, a remittance generating engine is provided for receiving the pre-defined data and for forwarding remittance data to at least one remittance recipient.

These and other features and advantages of the present invention will become apparent as the following Detailed Description proceeds and upon reference to the Drawings wherein like numerals depict like parts, and in which:

BRIEF DESCRIPTION OF THE DRAWINGS

FIG. 4 is an exemplary data file for use by the system of the present invention.

It will be appreciated by those skilled in the art/that although the following Detailed Description will proceed with reference being made to preferred embodiments, the present invention is not intended to be limited to these embodiments. For example, it should be understood from the outset that although preferably the functional components of the preferred embodiments of the system of the present invention are embodied as one or more distributed computer program processes running on one or more conventional general purpose computers (e.g., IBM-compatible, Apple MacIntosh, and/or RISC microprocessor-based computers), conventional telecommunications (e.g., modem and/or ISDN means), and MICR devices networked together by conventional network hardware and software, other types of computers and network resources may be used without departing from the present invention. Furthermore, it should be appreciated from the outset that one or more of the functional components may alternatively be constructed out of custom, dedicated electronic hardware and/or software, with departing from the present invention. Thus, the present invention is intended to cover all such alternatives, modifications, and equivalents as may be included within the spirit and broad scope of the invention as defined only by the hereinafter appended claims.

As used herein, payment information includes check data and remittance data. As shown in FIG. 4, check data 86 is that data processed according to the herein-described invention of FIG. 1 and 2. Remittance data 84 is that data processed according to the invention described with reference to FIG. 3.

DETAILED DESCRIPTION OF PREFERRED EMBODIMENTS

Figure 1:
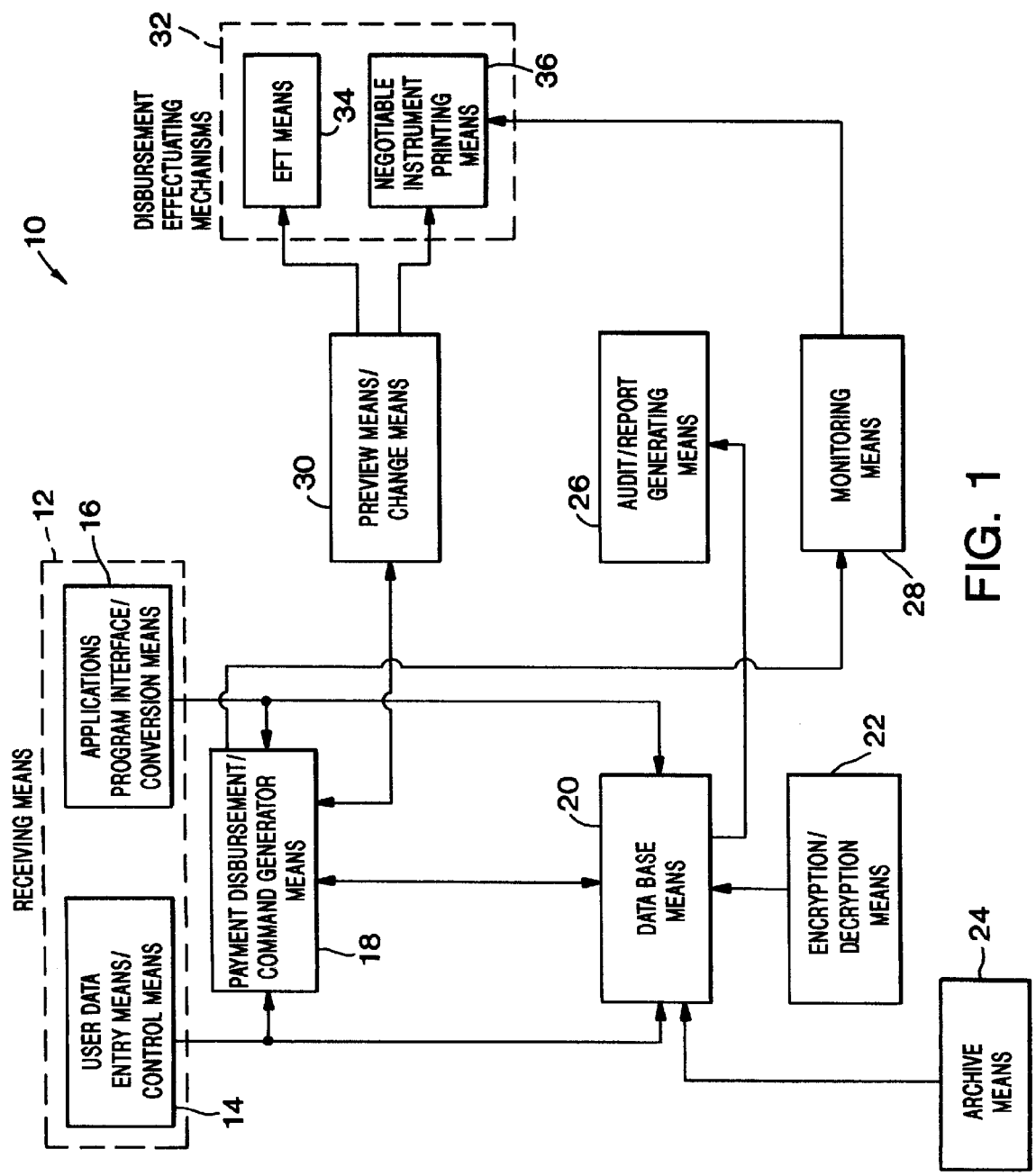
FIG. 1 is a block diagram of the functional components of one embodiment of the system of the present invention.
Figure 2:
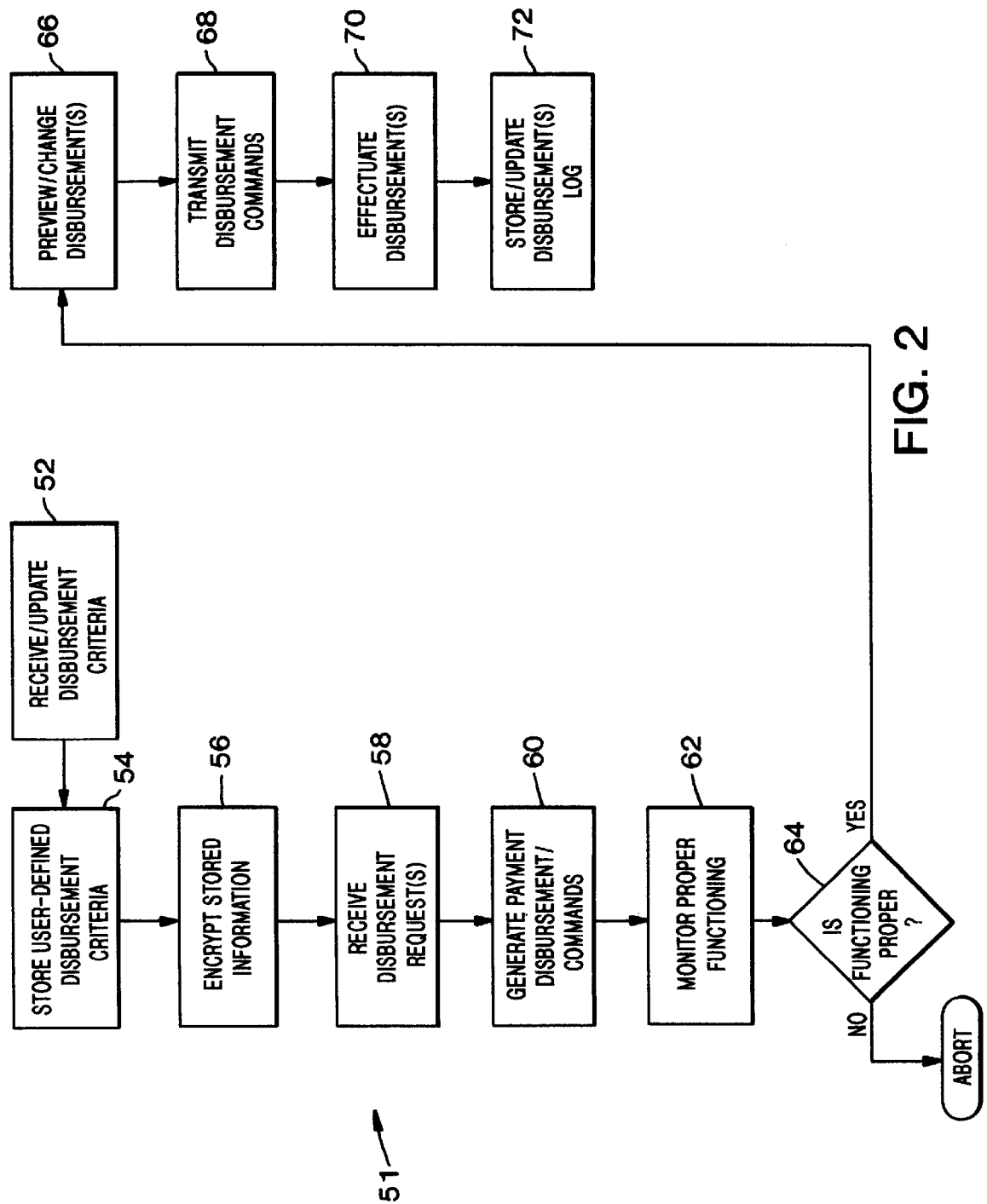
FIG. 2 is a block flow diagram of one embodiment of the process of the present invention.

Turning to FIGS. 1–2, preferred embodiments of the system and process of the present invention will now be described. Embodiment 10 comprises means 12 for receiving individual disbursement requests from conventional user data entry means/control means 14 and/or external application program interface/conversion means 16. Data entry means 14 preferably comprises a conventional graphical user interface running on a terminal screen and having a plurality of data fields for permitting entry of the data making up an individual disbursement request. Additionally, means 14 permits user control of the system, and access to information stored in the system, in the manner that will be described more fully below. Interface/conversion means 16 preferably takes information to be included in individual disbursement request from other systems (e.g., other application programs, such as accounting or financial database systems) and converts that information into a format usable by the system 10. As will be described more fully below, means 16 also receives and converts information from other systems to be included in disbursement criteria to be stored in the database 20.

Preferably, an individual disbursement request includes information related to the type and/or name of payee, amount of disbursement, payee group, etc. The request may also include the desired negotiable instrument, however, as will be described more fully below, if this information is not supplied and disbursement by negotiable instrument is desired, the user may command the system 10 to automatically determine what the next sequential negotiable instrument number should be, and to cause the negotiable instrument generated by the system 10 to have that number. Alternatively, the negotiable instrument generated may have no number.

Individual disbursement requests entered into the system 10 via the receiving means 12 are then transmitted to the payment disbursement/command generator means 18. Generator means 18 automatically generates an individual payment disbursement and commands for effectuating same based upon the individual disbursement request received by the receiving means 12 and user-predefined disbursement criteria stored in the database means 20. preferably, the generator means 18 accomplishes this by automatically determining the type of the individual request by querying the database means 20 as to whether the payee name, type, and/or group data of the individual request received from receiving means 12 corresponds to disbursement criteria currently found in the database 20. If such correspondence is found to exist, the database means 20 transmits to the generator means 18 the disbursement criteria corresponding to the individual request. The generator 18 then uses the information transmitted from the database 20 and that from the individual request to generate control signals for permitting user preview of the disbursement by the preview means 30 and ultimately, effectuation of the disbursement by one or more effectuating mechanisms 32, as will be described more fully below. If such correspondence is not found to exist, the user may be prompted by the preview means 30 (which is described more fully below) to supply the missing information (i.e., the information that would have been supplied by the disbursement criteria had it been stored in the database means 20), which is then used by the generator 18 to generate the control signals.

Disbursement criteria are stored in database means 20. As discussed briefly above, in system 10, this is accomplished by entering the data for the criteria for each payee type (i.e., payee name and/or group) into the system 10 via the data entry means 14 and/or interface/conversion means 16. This information is then transmitted to and stored in the database means 20. preferably, database means 20 comprises a conventional SQL-type relational database in which disbursement criteria are associated according to payee name, type, and/or group. preferably, the disbursement criteria for each payee type includes the type and manner of disbursement desired (i.e., whether disbursement is desired by EFT or printed negotiable instrument) and the type of account from which disbursement is desired (e.g., bank or credit card account). Additionally, the disbursement criteria may also include endorsement signature and/or maker logo data for permitting the generator means 18 to generate appropriate commands for automatically effectuating disbursement of a negotiable instrument with a desired endorser's signature and graphic logo already printed onto the instrument.

Disbursement commands generated by the generator means 18 are transmitted to the user preview means 30, which preferably comprises a conventional graphical user interface display means on which is displayed the information for each payment disbursement generated by the system 10, prior to being effectuated by the system 10. preview means 30 also includes conventional user input means for permitting the user to be able to make changes to the disbursements prior to their being effectuated by the system 10. Any change made to a disbursement causes the generator means 30 to generate new disbursement command signals based upon the changed disbursement information, which then displayed by preview means 30 to permit the user to preview the corrected disbursement, and to make further changes, if desired.

Once the user indicates to the system 10 (by e.g., selecting an appropriate option on the preview means graphical interface) that the disbursement is acceptable, the system 10 then effectuates the disbursement. preferably, in system 10, this is accomplished by transmitting the disbursement commands generated by the generator means 18 to the disbursement effectuating means 32. Effectuating means 32 preferably comprises EFT effectuating means 34 and negotiable instrument printing means 36 for effectuating EFT disbursements and/or printed negotiable instrument disbursements, as determined by the disbursement criteria stored in the database means 20 (or supplied by the user via the preview means 30, in the manner discussed above) for each of the disbursement types. preferably, EFT effectuating means 34 comprises conventional financial EDI and ACH means, and printing means 36 comprises one or more conventional MICR laser printer means. Of course, the types of EFT protocols and negotiable instrument forms supported by the means 34 and 36, respectively, are variable depending upon the particular needs of the user of the system 10 and the protocols supported by the institutions whose disbursement accounts are to be debited. Additionally, generator means 18 generates control signals appropriate for effectuation of the disbursements using means 34 and 36. After disbursement has been effectuated, the information used to generate the disbursement is stored in database means 20 for later retrieval, auditing, and/or use in reports generated by audit generating means 26, in the manner that will be described more fully below.

System 10 also includes encryption/decryption means 22. Means 22 encrypts information stored in the database means 20 to prevent access thereto by unauthorized personnel. The information stored in the database 20 may be retrieved into a user-readable form (via e.g., the audit means 26) by supply of a user-specified or predetermined password string to the system 10 via the entry means 14. Likewise, entry of disbursement requests to the system 10 may be prevented by preventing decryption of disbursement criteria stored in the database 20 by the rest of the system 10 unless the password is supplied to the system 10 via the entry means 14 prior to entry of the disbursement requests.

Data archive means 24 uses conventional data compression techniques to compress and archive infrequently used data stored in the storage means 20. This reduces the amount of storage space dedicated to storage of infrequently used data, thereby increasing the amount of space available for storage of other, more frequently used data.

Audit/report generating means 26 comprises conventional display and/or hard copy printing means (not separately shown) for generating disbursement and/or other financial reports based upon the disbursement information and criteria stored in the database 20. As noted above, unless an appropriate password is entered to the system 10 via the user control means 14, the information stored in the database means 20 remains encrypted, thereby preventing access to useful data by the audit generating means 26. Audit generating means 26 may also permit transmission to the institutions whose accounts are to be debited confirms of the disbursements whereby to permit so-called "positive pay" capabilities.

Finally, system 10 also comprises monitoring means 28 for monitoring the system 10 to ensure that the system 10 is functioning properly and that no improper disbursements are made. If a fault condition is determined to exist anywhere in the system 10, the monitoring means 28 prevents the effectuating mechanisms 32 from effectuating disbursements, and indicates the failure condition to the user by conventional means.

With reference being made to FIG. 2, one preferred embodiment 51 of the process of the present invention will now be described. Process 51 begins with the user inputting and/or updating disbursement criteria to the database means (as shown at block 52) via the receiving means 12. These criteria are then stored by the database means (see block 54) and encrypted (see block 56) by the encryption means 22. An acceptable password is then entered to enable access to the information stored in the database. One or more disbursement requests are then input to the system 10 by the receiving means 12 (see block 58). The generator means 18 uses the disbursement requests and the criteria stored in the database to generate the payment disbursements and effectuating commands (see block 60), in the manner described previously. Functioning of the system 10 is monitored (see block 62) as described above with reference to monitoring means 28, and if it is determined to be improper, disbursement is aborted, and the user is notified of the failure condition (see "No" branch of block 64). If the system is functioning properly (see "YES" branch of block 64), the user is then permitted to preview and change the disbursements by the preview means 30, if desired (see block 66). Assuming the disbursements are acceptable the effectuating commands are transmitted to the effectuating mechanisms 32 (see block 68). The disbursements are then effectuated by the mechanisms 32 (see block 70). The disbursements are then stored in the disbursement log (not shown) of the database means 20 (see block 72).

Figure 3:
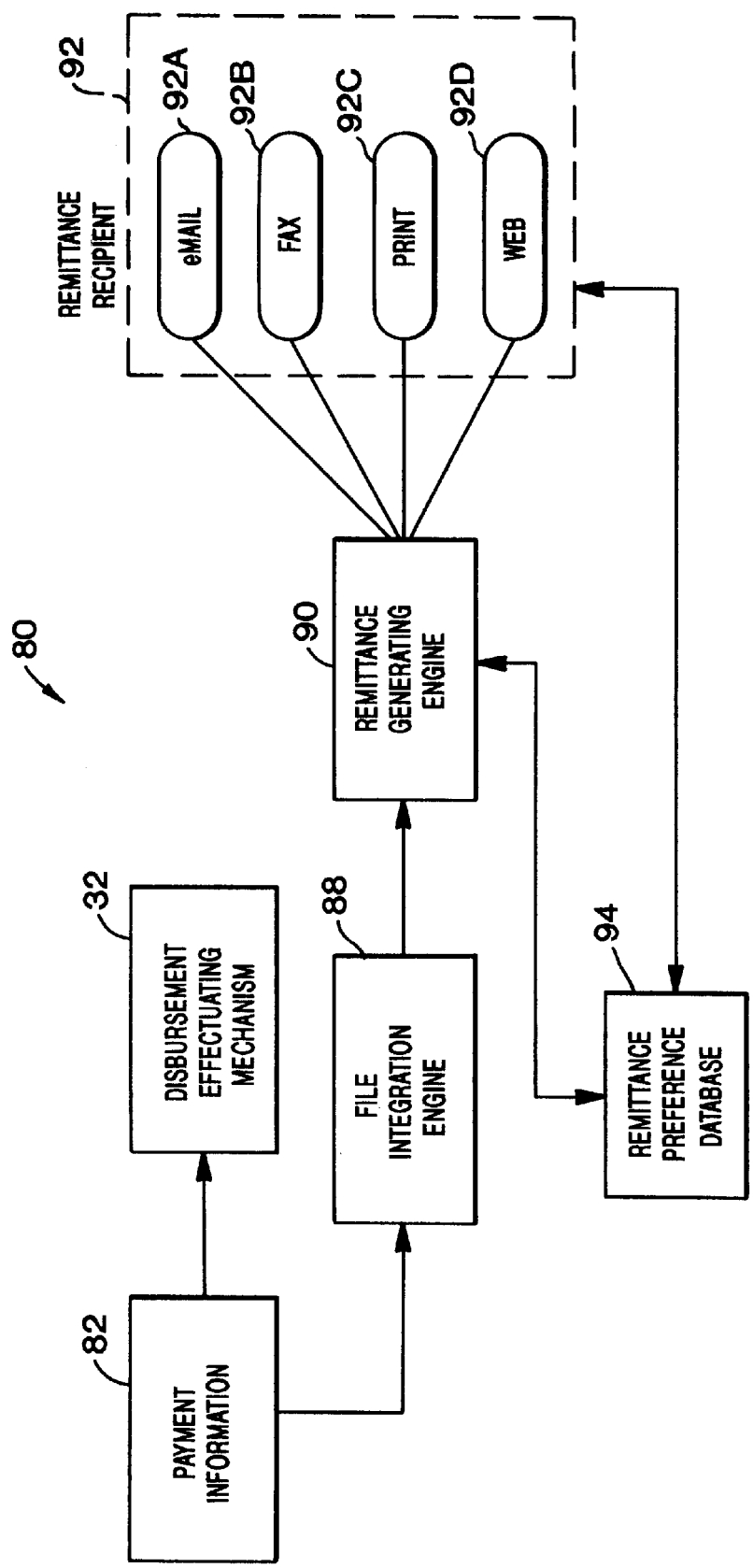
FIG. 3 is a block diagram of the functional components of the remittance advice delivery system of the present invention.

Referring now to FIG. 3, the remittance delivery system 80 of the present invention is depicted in functional block diagram form. As an overview, remittance delivery system 80 of the present invention is designed to receive and interpret payment application data (e.g. generated by financial applications (e.g., accounting systems, A/P, P/R, T&E, etc.)), reformat the data into an appropriate format, and forward the remittance data portion thereof (e.g., stub information portion) to a recipient in one or more user pre-defined formats. Referring briefly to FIG. 4, Payment Information 82 includes check data 86 and the "stub portion" 84 (remittance data) of the payment. Check data 86 is processed in accordance with the above-defined principles, i.e., to effectuate and EFT and/or negotiable instrument payment via disbursement effectuating mechanism 32. Remittance delivery system 80 is designed to accept the remittance data 84 (i.e., invoice data, message data, payee information data, etc.) and provide same to an intended recipient in one or more of a plurality of pre-selected formats and/or delivery mechanisms.

Accordingly, payment information 82 is provided to file integration engine 88 which translates and/or formats the data received (generated by accounting systems, A/P, P/R, T&E, etc.) into a single format for further processing. To that end, file integration engine 88 is preferably adapted with appropriate file filter/reading mechanisms to accommodate a variety of payment information data formats. In addition, modular updates may be added to file integration engine 88 to permit reading of new data formats. Once the data is in the appropriate format, the data is fed into remittance generating engine 90 which is preferably adapted to automatically effectuate delivery of remittance data in one or more pre-selected formats to one or more intended recipients, as described below.

Remittance generating engine 90 receives preformatted data from file integration engine 88 and effectuates a remittance delivery to an intended recipient 92. As shown in FIG. 3, the remittance advice can be output to a recipient as an email (e.g., MAPI, VIM, cc:mail, etc) 92A, fax (e.g., COPIA, AIFP, FACSYS MAPI, etc.) 92B, hard copy print 92C and/or internet transmission via the Web 92D. To that end, remittance generating engine 90 scans a data field (or fields) in the data to identify the recipient, e.g., by name, e-mail address, company name, identification number, etc. This information is checked against remittance preference database 94, to ensure that the remittance will be forwarded to the proper recipient, and by the proper, pre-defined method of delivery. If a proper match is found, the remittance data is forwarded. If not, an error is returned to the user of the system 80 indicating same. To that end, the user can instruct the system 80 to print all error messages, or to recheck the data using a different data field.

Advantageously, remittance preference database 94 can be updated both by a user of system 80, and by any recipient (e.g. payee-vendor) who receives a remittance delivery; thereby permitting a recipient to change the message delivery preference, e.g., from email to fax, etc., or change other data within the payment data shown in FIG. 4. Thus, remittance preference database 94 can be appropriately adapted with networking hardware/software to permit remote recipients access to the database. It should be noted that remittance preference database 94 is preferably adapted with standard and/or proprietary password protection algorithms to ensure security. In addition to identification information, remittance preference database 94 also can associate message data, preferred format data, preferred delivery data, etc. with the remittance data.

Modifications to the present invention are possible. For example, remittance generating engine 90 can be appropriately adapted to forward an email remittance delivery as a text file, text attachment, or as a pre-selected file format (e.g., MS Word, accounts receivable input data file, etc.). In addition, remittance generating engine 90 can be appropriately modified to automatically compress (e.g., via ZIP algorithms, etc) and/or password encrypt any electronic transmission.

Moreover, the system 80 of the present invention is intended to provide remittance advice delivery to both enterprise recipients and individual recipients, and it should be noted that the present invention can be appropriately configured as a network-based system to permit, e.g., geographically remote data input (payment detail 82) and/or geographically remote remittance delivery. Also, the present invention permits all of the information included in the payment information to be processed in a single step. Thus, the check data 86 and remittance data 84 can all be processed in one pass: via the system shown in FIG. 1 and FIG. 3, respectively.

It will be understood by those skilled in the art that file integration engine, remittance generating engine and preference database 94 can be composed of off-the-shelf and or proprietary computer hardware processes and/or components and modified to achieve the stated functionality. In addition, it will be appreciated that although not shown in the drawings, remittance generating engine is appropriately adapted with hardware and/or software to permit forward of remittance data via the mechanisms shown in reference number 92 of FIG. 3.

Thus, it is evident that there has been provided a remittance delivery system and method that fully satisfy the aims and objectives hereinbefore set forth. It will be appreciated that although specific embodiments of the present invention have been presented, many modifications, alternatives, and equivalents thereof may be made without departing from the spirit and scope of the invention. Accordingly, the present invention is intended to cover all such alternatives, modifications, and equivalents as may be included within the spirit and broad scope of the invention as defined only by the hereinafter appended claims.

What is claimed is:

1. A remittance delivery system, comprising: a remittance preference database storing information pertaining to at least one remittance recipient; a file integration engine receiving payment information data including remittance data in a one of a plurality of data formats and translating and formatting said remittance data into a single, pre-defined data format; and a remittance generating engine receiving said pre-defined data and forwarding said formatted remittance data to said at least one remittance recipient based on the information stored in said remittance preference database.

2. A system as claimed in claim 1, wherein said remittance data comprises invoice data, name data, company name data and identification number data.

3. A system as claimed in claim 1, wherein said remittance data is generated by one or more accounting systems including accounts payable, payroll and T&E data generating systems.

4. A system as claimed in claim 1, wherein said remittance data is forwarded as a facsimile transmission to said recipient's fax number.

5. A system as claimed in claim 1, wherein said remittance data is forwarded as printed data.

6. A system as claimed in claim 1, wherein said remittance generating engine also is for compressing and encrypting said remittance data before said data is forwarded to said recipient.

7. A system as claimed in claim 1, wherein each said recipient is permitted access to said database to update and/or create recipient preference data.

8. A system as claimed in claim 1, wherein said remittance generating engine also is for comparing said remittance data to said database to determine the identity and preference of said recipient.

9. A system as claimed in claim 1, wherein said remittance data is forwarded as email message data to said recipient's email account.

10. A system as claimed in claim 9, wherein said email message data further includes attachment data in a predefined format containing said remittance data.

11. A method of providing automatic remittance advice delivery, comprising the steps of:

formatting a plurality of differing remittance data into a predefined file data format;

determining a pre-selected delivery mechanism stored in a remittance recipient database;

generating remittance advice data based on pre-selected criteria stored in said remittance recipient database; and forwarding said remittance data to one or more recipients using said pre-selected criteria and said pre-selected delivery mechanism.

12. A method as claimed in claim 11, wherein said remittance data includes one or more payment data being generated by one or more payment systems.

13. A method as claimed in claim 11, wherein said delivery mechanism includes facsimile.

14. A method as claimed in claim 11, said database being accessible by the sender of said remittance data and said recipient of said remittance data.

15. A method as claimed in claim 11, wherein said delivery mechanism includes electronic mail.

16. A method as claimed in claim 15, further comprising the step of compressing and encrypting said electronic mail data before forwarding to said recipient.

\* \* \* \* \*